C. GROTNES.
VEHICLE.
APPLICATION FILED FEB. 21, 1910.
1,059,149.
Patented Apr. 15, 1913.
2 SHEETS—SHEET 1.
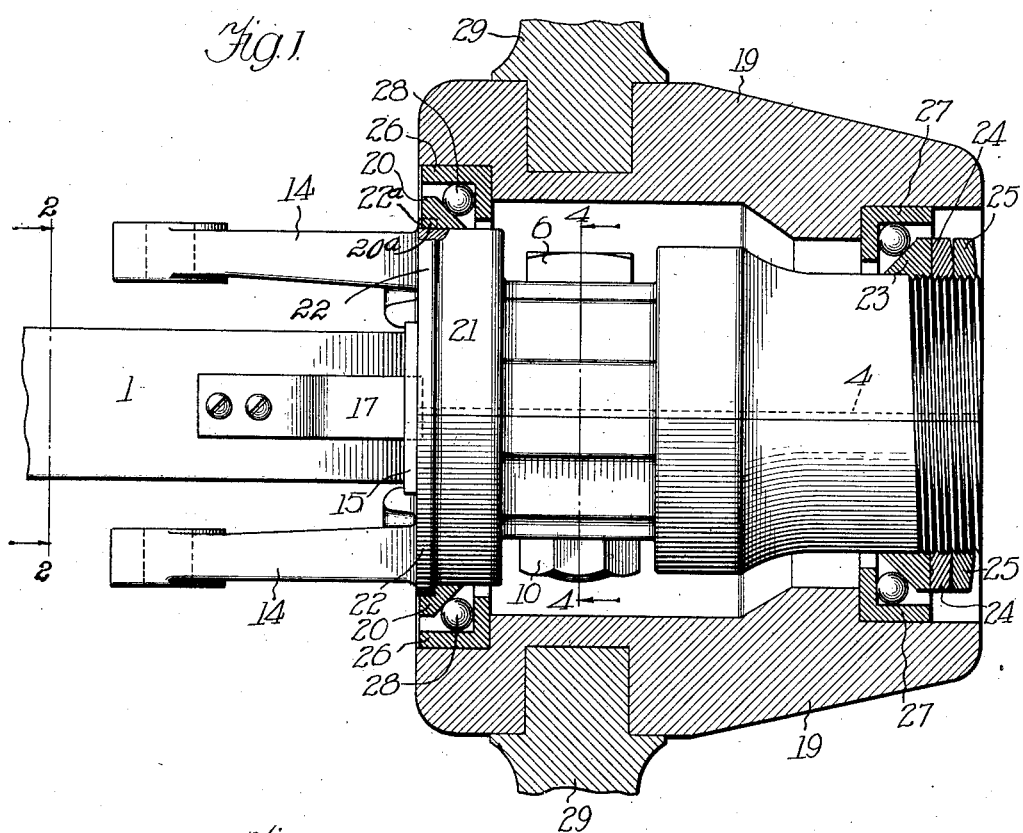
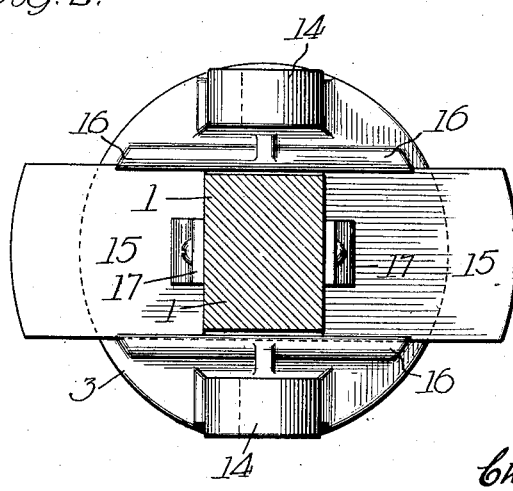

C. GROTNES.
VEHICLE.
APPLICATION FILED FEB. 21, 1910.

1,059,149.

Patented Apr. 15, 1913.
2 SHEETS—SHEET 2.

Witnesses:
C. P. Parker
George L. Chindahl

Inventor:
Charles Grotnes
By Luther L. Miller
Atty

UNITED STATES PATENT OFFICE.

CHARLES GROTNES, OF CHICAGO, ILLINOIS.

VEHICLE.

1,059,149.  Specification of Letters Patent.  Patented Apr. 15, 1913.

Application filed February 21, 1910. Serial No. 544,993.

*To all whom it may concern:*

Be it known that I, CHARLES GROTNES, a citizen of the United States, residing at Chicago, in the county of Cook and State of Illinois, have invented certain new and useful Improvements in Vehicles, of which the following is a specification.

This invention relates to automobiles and other vehicles in which certain of the wheels are attached to a stationary axle by means permitting the wheel to be turned in a horizontal plane for steering and other purposes. Heretofore such wheels have been rotatably mounted upon a knuckle or short arm hinged to the axle or other support at a point outside of the wheel. The axis of the turning movement of the wheel, therefore, has been located outside of the wheel, a construction which in practice has caused severe strains to be placed upon the knuckle and the steering gear.

The object of this invention is to produce means for supporting an automobile or other wheel so that it may turn in a horizontal plane upon a center located at the rotative center of the wheel, whereby a much stronger construction is obtained than has heretofore been used, and whereby the steering gear is relieved of the excessive stresses heretofore placed upon it.

Figure 3:
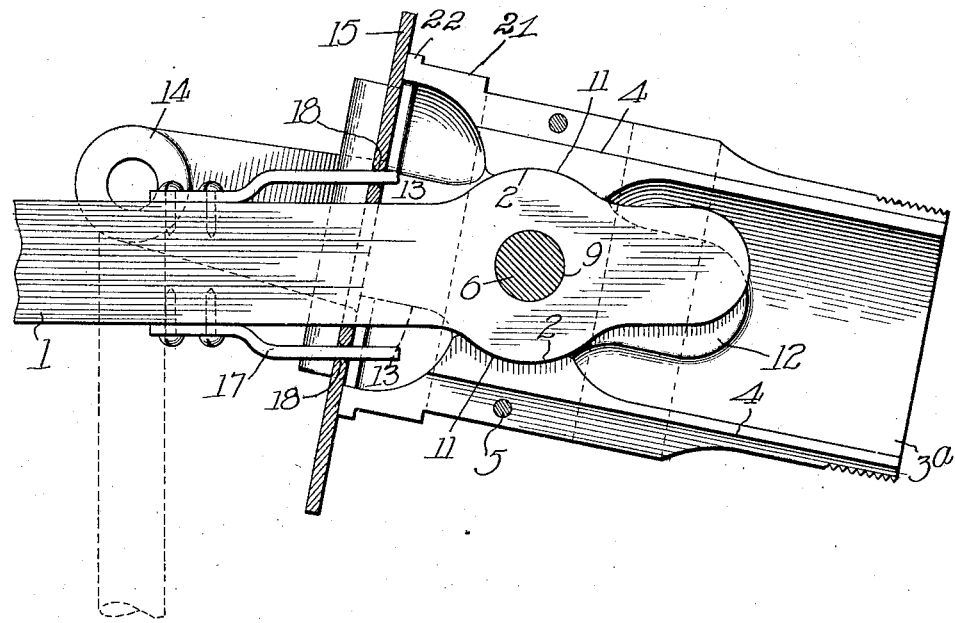
Figure 4:
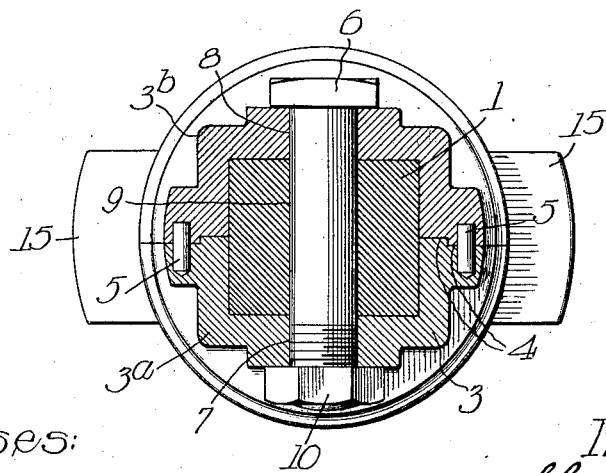

In the accompanying drawings, Figure 1 is an elevational view illustrating my invention and showing the wheel hub in section. Fig. 2 is a section on line 2 2 of Fig. 1. Fig. 3 is a horizontal sectional view with the wheel omitted. Fig. 4 is a section on line 4 4 of Fig. 1.

The axle may be of any suitable construction. I have herein shown an axle 1 which is rectangular in cross-section and which has means adjacent to its ends for forming a hinge connection between the axle and a skein mounted thereon. In this instance, said means consists of an enlargement of the axle forming the convex vertical bearing faces 2.

The skein 3 consists in this instance of two sections, a lower half 3ª and an upper half 3ᵇ, the halves being substantial counterparts and being rabbeted as at 4 upon their adjacent faces. Dowel pins 5 may be provided to assist in holding the sections of the skein together in proper relation. A bolt 6 extends through registering openings 7, 8 and 9 in the skein sections and the axle 1, respectively, and serves as a means for holding the skein sections together and for pivotally connecting the skein to the axle. A nut 10 is turned upon the threaded end of the bolt.

The skein 3 is interiorly chambered to receive the end of the axle, concave vertical bearing faces 11 being formed upon the skein sections to fit upon the convex bearing faces 2 of the axle. The chamber in the skein is of sufficient size at each side of the surfaces 11 to permit the necessary extent of pivotal movement of the skein 3 upon the axle in a horizontal plane. A surface 12 is provided upon each skein section to lie in contact with the upper and lower sides of the axle at the outer end thereof, similar surfaces 13 upon said skein sections lying in contact with a portion of the axle at the inner side of the point of pivotal connection between the axle and the skein. A wide bearing is thereby provided between the axle and the skein.

Any suitable means may be provided for turning the skein upon the axis of the pivot bolt 6. I have herein shown an arm 14 cast integral with each skein section, the outer ends of said arms being adapted for connection to steering gear of any approved construction.

To prevent the entrance of dust into the skein, I provide two guard plates 15 mounted at opposite sides of the axle 1 in horizontal guideways 16 formed upon the skein sections. Each guard plate is slidable in said guideways so that its position may be accommodated to that of the axle when the skein is turned, as indicated in Fig. 3. In order to hold the guard plates in contact with the axle, I provide suitable means, such as springs 17, said springs being fixed at one end to opposite sides of the axle and the free ends of the springs engaging within openings 18 in the guard plates. As the skein swings in one direction, one of the guard plates 15 is pushed outwardly in its guideways by the axle, and the other guard plate is moved inwardly in its guideways by its spring 17.

The hub 19 of the wheel is mounted in any suitable manner upon the skein. I have herein shown a ball bearing between the skein and the wheel, said ball bearing comprising a cone 20 mounted upon the peripheral surface 21 at the inner end of the skein and retained in place by a peripheral flange 22 on the skein. Suitable means may be provided to prevent rotation of the cone 20 upon the skein, such as a tongue 20ª upon the cone adapted to engage in a groove 22ª in the flange 22. The cone 23 is mounted upon the opposite end of the skein and is held in place by a nut 24 and a jam nut 25 turned on the threaded outer end of the skein. The hub is provided with suitable ball races 26 and 27, antifriction balls 28 running between said ball races and the cones 20 and 23. The spokes 29 are preferably so arranged upon the hub that the point of contact of the tire of the wheel with the roadway shall be directly below the bolt 6.

It will be seen that the wheel may be turned in a horizontal plane upon a vertical axis passing through the point of contact of the wheel with the roadway. The stresses caused by the rolling of the wheel over the roadway are transmitted directly to the pivotal support for the wheel instead of being transmitted through a knuckle to a hinge connection outside of the wheel. The stresses arising in practice are therefore borne directly by the axle instead of by the knuckle and the steering gear.

I would have it understood that the invention is not limited to the details herein shown and described, for various modifications will occur to persons skilled in the art.

I claim as my invention:

1. The combination of a chambered skein, an axle extending into said skein and pivotally connected therewith, dust-guarding means mounted on one end of said skein for sliding movement transversely of the skein and the axle, and a wheel mounted on said skein.

2. The combination of a chambered skein, an axle extending into said skein and pivotally connected therewith, a pair of dust-guarding plates slidably mounted on one end of said skein at opposite sides of said axle, means on said axle for holding said plates in contact with said axle, and a wheel mounted on said skein.

3. The combination of a chambered skein; an axle extending into said skein and pivotally connected therewith; guideways on one end of said skein; a pair of dust-guarding plates slidable in said guideways at opposite sides of said axle; a pair of springs fixed to opposite sides of said axle, said springs engaging said plates for holding the plates in contact with said axle; and a wheel rotatably mounted on said skein.

CHARLES GROTNES.

Witnesses:
C. P. PARKER,
GEORGE L. CHINDAHL.

---

Copies of this patent may be obtained for five cents each, by addressing the "Commissioner of Patents, Washington, D. C."